(12) United States Patent
Abotabl et al.

(10) Patent No.: US 12,120,719 B2
(45) Date of Patent: Oct. 15, 2024

(54) SIDELINK CHANNEL ACCESS USING REFERENCE SIGNAL RECEIVED POWER AND SIGNAL TO INTERFERENCE AND NOISE RATIO MEASUREMENTS

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US); Wei Yang, San Diego, CA (US); Seyedkianoush Hosseini, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 750 days.

(21) Appl. No.: 17/303,316

(22) Filed: May 26, 2021

(65) Prior Publication Data
US 2022/0386312 A1 Dec. 1, 2022

(51) Int. Cl.
*H04W 72/54* (2023.01)
*H04W 72/542* (2023.01)

(52) U.S. Cl.
CPC ................ *H04W 72/542* (2023.01)

(58) Field of Classification Search
CPC .................................. H04W 72/542
See application file for complete search history.

(56) References Cited

U.S. PATENT DOCUMENTS

2022/0069884 A1* 3/2022 Zhang ............... H04B 7/088
2023/0097142 A1* 3/2023 Alfarhan ............ H04L 5/0051
370/329

* cited by examiner

*Primary Examiner* — Curtis B Odom
(74) *Attorney, Agent, or Firm* — Guang Yu Zhang; Harrity & Harrity, LLP

(57) ABSTRACT

Various aspects of the present disclosure generally relate to wireless communication. In some aspects, a user equipment (UE) may determine a resource availability based at least in part on measurement information, wherein the measurement information includes information related to a first measurement regarding a set of resources and a second measurement regarding the set of resources, and wherein the measurement information relates to self-interference associated with a transmission of the UE. The UE may communicate using a resource, of the set of resources, based at least in part on the resource availability. Numerous other aspects are described.

30 Claims, 8 Drawing Sheets

SIDELINK CHANNEL ACCESS USING REFERENCE SIGNAL RECEIVED POWER AND SIGNAL TO INTERFERENCE AND NOISE RATIO MEASUREMENTS

FIELD OF THE DISCLOSURE

Aspects of the present disclosure generally relate to wireless communication and to techniques and apparatuses for sidelink channel access using reference signal received power and signal to interference and noise ratio measurements.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory, and one or more processors, coupled to the memory, configured to: determine a resource availability based at least in part on measurement information, wherein the measurement information includes information related to a first measurement regarding a set of resources and a second measurement regarding the set of resources, and wherein the measurement information relates to self-interference associated with a transmission of the UE; and communicate using a resource, of the set of resources, based at least in part on the resource availability.

In some aspects, a method of wireless communication performed by a UE includes determining a resource availability based at least in part on measurement information, wherein the measurement information includes information related to a first measurement regarding a set of resources and a second measurement regarding the set of resources, and wherein the measurement information relates to self-interference associated with a transmission of the UE; and communicating using a resource, of the set of resources, based at least in part on the resource availability.

In some aspects, a non-transitory computer-readable medium storing a set of instructions for wireless communication includes one or more instructions that, when executed by one or more processors of a UE, cause the UE to: determine a resource availability based at least in part on measurement information, wherein the measurement information includes information related to a first measurement regarding a set of resources and a second measurement regarding the set of resources, and wherein the measurement information relates to self-interference associated with a transmission of the UE; and communicate using a resource, of the set of resources, based at least in part on the resource availability.

In some aspects, an apparatus for wireless communication includes means for determining a resource availability based at least in part on measurement information, wherein the measurement information includes information related to a first measurement regarding a set of resources and a second measurement regarding the set of resources, and wherein the measurement information relates to self-interference associated with a transmission of the apparatus; and means for communicating using a resource, of the set of resources, based at least in part on the resource availability.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
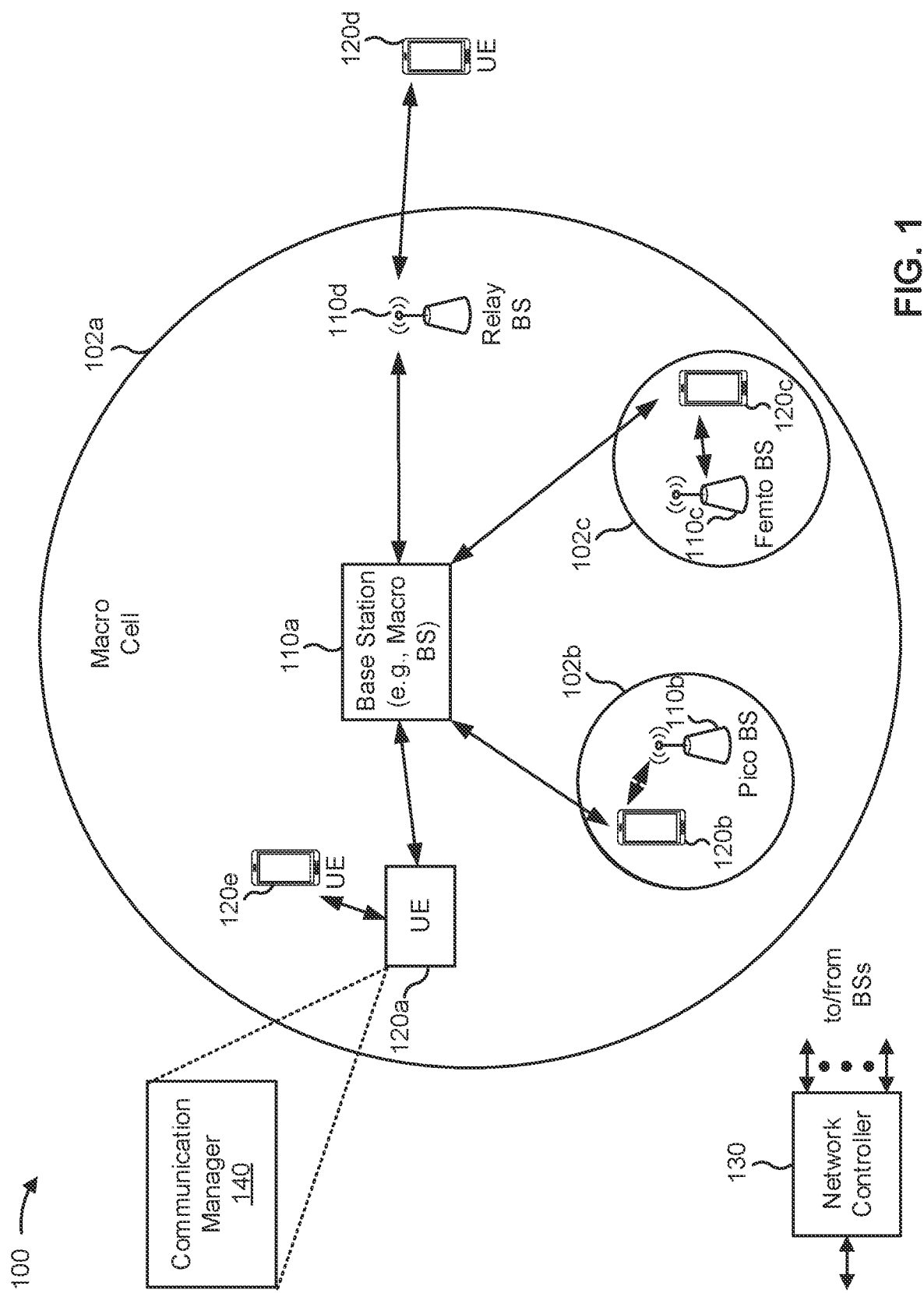
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of BSs 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a BS 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the BS 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the UE 120 may include a communication manager 140. As described in more detail elsewhere herein, the communication manager 140 may determine a resource availability based at least in part on measurement information, wherein the measurement information includes information related to a first measurement regarding a set of resources and a second measurement regarding the set of resources, and wherein the measurement information relates to self-interference associated with a transmission of the UE; and communicate using a resource, of the set of resources, based at least in part on the resource availability. Additionally, or alternatively, the communication manager 140 may perform one or more other operations described herein.

As indicated above, FIG. 1 is provided as an example. Other examples may differ from what is described with regard to FIG. 1.

Figure 2:
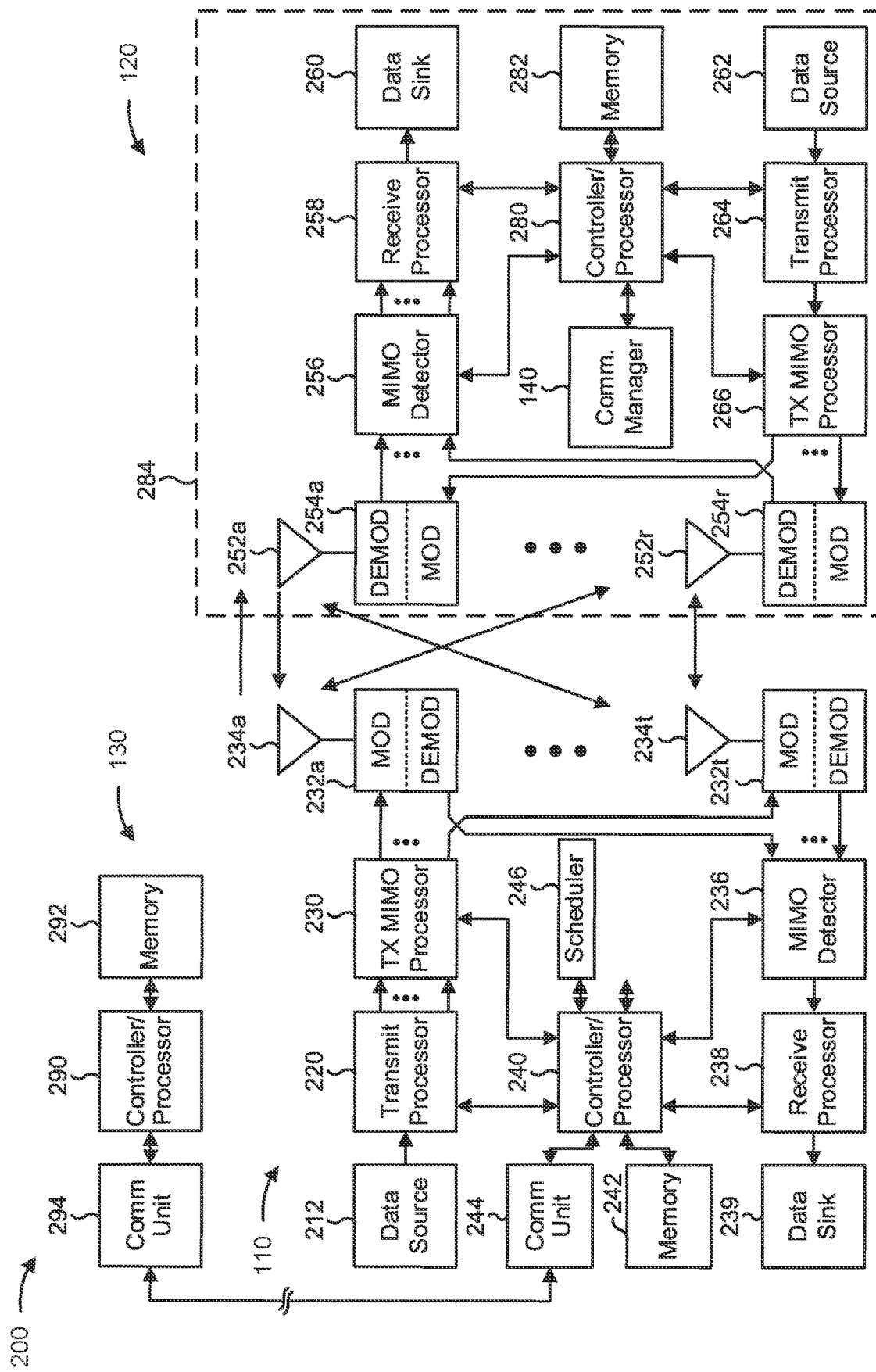
FIG. 2 is a diagram illustrating an example of a base station in communication with a UE in a wireless network, in accordance with the present disclosure.

FIG. 2 is a diagram illustrating an example 200 of a BS 110 in communication with a UE 120 in a wireless network 100, in accordance with the present disclosure. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with BS 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to BS 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 6-7).

At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. BS 110 may include a scheduler 246 to schedule UEs 120 for downlink and/or uplink communications. In some aspects, a modulator and a demodulator (e.g., MOD/DEMOD 232) of the BS 110 may be included in a modem of the BS 110. In some aspects, the BS 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/ processor 240) and memory 242 to perform aspects of any of the methods described herein (for example, as described with reference to FIGS. 6-7).

Controller/processor 240 of BS 110, controller/processor 280 of UE 120, and/or any other component(s) of FIG. 2 may perform one or more techniques associated with sidelink channel access using reference signal received power (RSRP) and signal to interference and noise ratio (SINR) measurements, as described in more detail elsewhere herein. For example, controller/processor 240 of BS 110, controller/processor 280 of UE 120, and/or any other component(s) of FIG. 2 may perform or direct operations of, for example, process 700 of FIG. 7 and/or other processes as described herein. Memories 242 and 282 may store data and program codes for BS 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the BS 110 and/or the UE 120, may cause the one or more processors, the UE 120, and/or the BS 110 to perform or direct operations of, for example, process 700 of FIG. 7 and/or other processes as described herein. In some aspects, executing instructions may include running the instructions, converting the instructions, compiling the instructions, and/or interpreting the instructions, among other examples.

In some aspects, a UE includes means for determining a resource availability based at least in part on measurement information, wherein the measurement information includes information related to a first measurement regarding a set of resources and a second measurement regarding the set of resources, and wherein the measurement information relates to self-interference associated with a transmission of the UE; and/or means for communicating using a resource, of the set of resources, based at least in part on the resource availability. The means for the UE to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example Other examples may differ from what is described with regard to FIG. 2.

Figure 3:
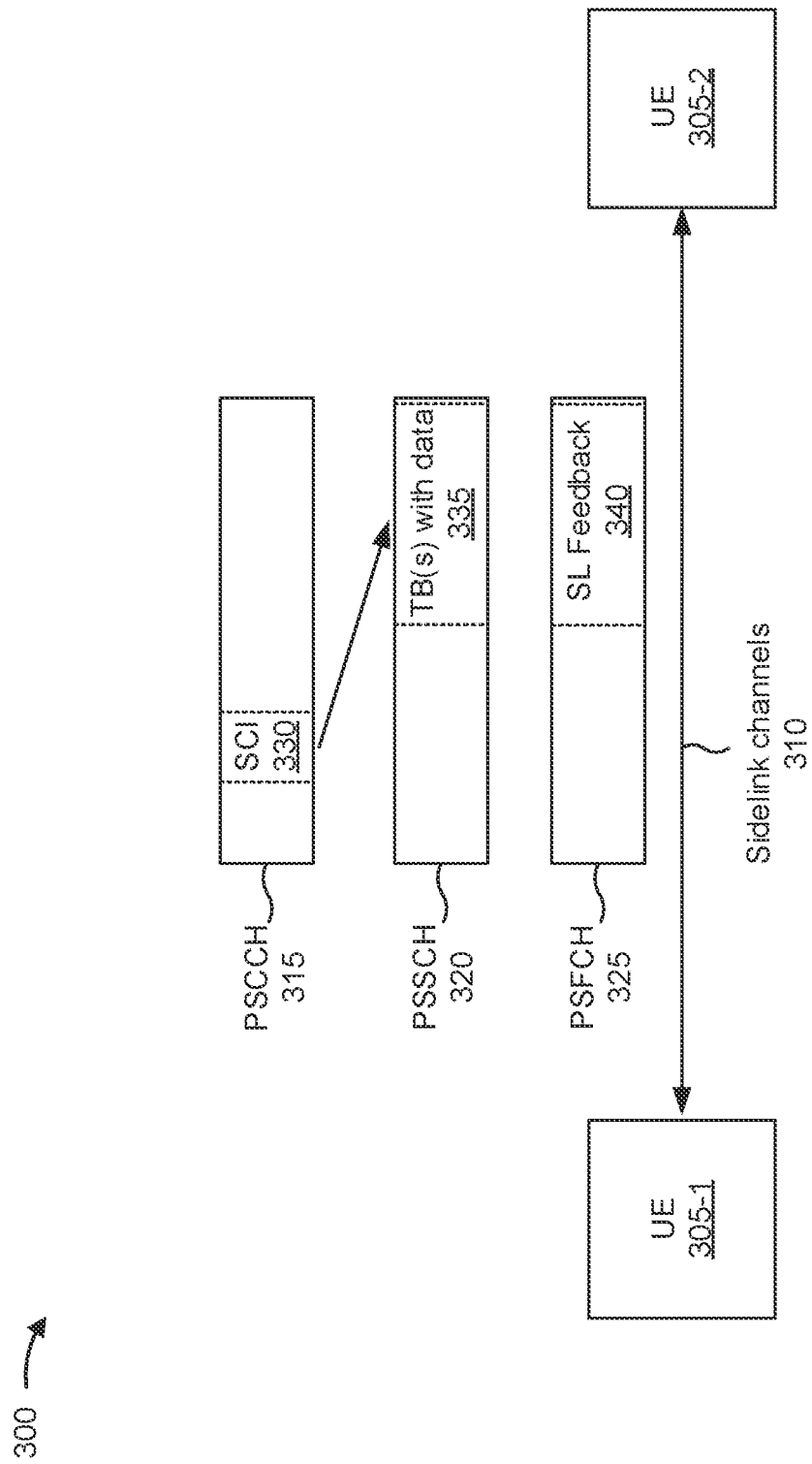
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or vehicle-to-pedestrian (V2P) communications), and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a BS 110 via an access link or an access channel. The PSSCH 320 may be used to communicate data, similar to a physical downlink shared channel (PDSCH) and/or a physical uplink shared channel (PUSCH) used for cellular communications with a BS 110 via an access link or an access channel. For example, the PSCCH 315 may carry sidelink control information (SCI) 330, which may indicate various control information used for sidelink communications, such as one or more resources (e.g., time resources, frequency resources, or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement (ACK) or negative acknowledgement (NACK) information), transmit power control (TPC), or a scheduling request (SR), among other examples.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a BS 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, or may measure a reference signal received quality (RSRQ) parameter (e.g., a PSSCH-RSRQ parameter) associated with various sidelink channels, among other examples, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. This may include performing a channel sensing procedure, as described in more detail herein. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or a modulation and coding scheme (MCS) to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example Other examples may differ from what is described with respect to FIG. 3.

Figure 4:
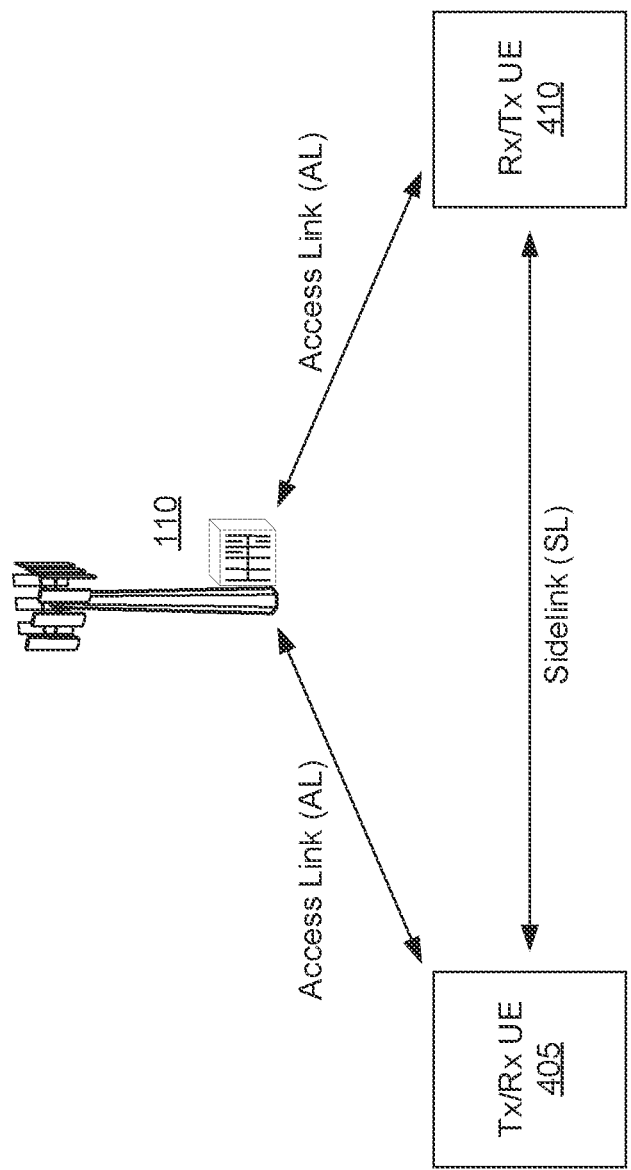
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a BS 110 may communicate with the Tx/Rx UE 405 via a first access link. Additionally, or alternatively, in some sidelink modes, the BS 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a BS 110 and a UE 120 (e.g., via a Uu interface) may be referred to as an access link. Sidelink communications may be transmitted via the sidelink, and access link communications may be transmitted via the access link. An access link communication may be either a downlink communication (from a BS 110 to a UE 120) or an uplink communication (from a UE 120 to a BS 110). Although UEs 405 and 410 may communicate with the BS 110 via the access link, UEs 405 and 410 may select resources for sidelink communication without having received a grant from the BS 110, such as by performing a channel sensing procedure, as described herein.

As indicated above, FIG. 4 is provided as an example Other examples may differ from what is described with respect to FIG. 4.

Figure 5:
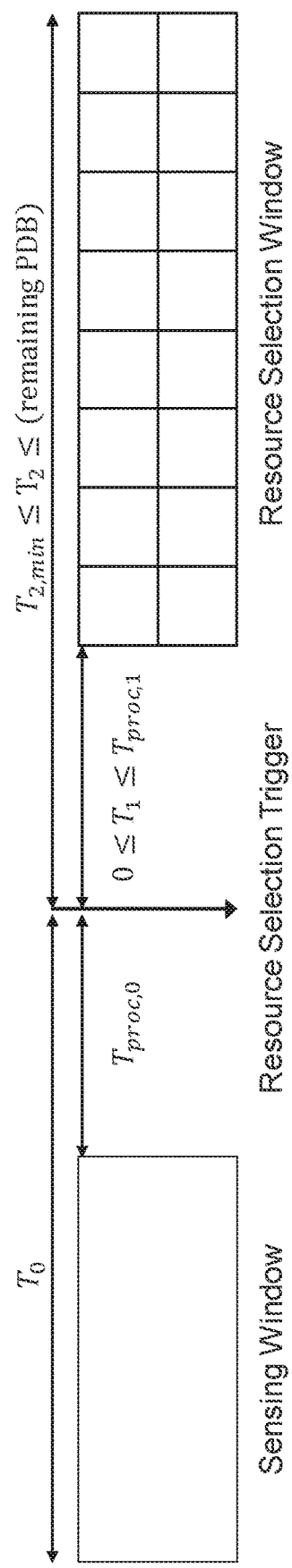
FIG. 5 is a diagram illustrating an example of resource selection using a sensing procedure, in accordance with the present disclosure.

FIG. 5 is a diagram illustrating an example 500 of resource selection using a sensing procedure, in accordance with the present disclosure.

As shown in FIG. 5, a UE, such as the UE 120 of FIG. 2, may use a sensing procedure to select resources for sidelink communication, such as described above in connection with FIG. 3. For example, a UE configured for communication in an NR network may perform the sensing procedure of example 500.

As shown in FIG. 5, a UE may perform a sensing procedure in a sensing window. In some cases, the sensing window may be 100 milliseconds (ms) (e.g., for aperiodic resource reservation, such as aperiodic reservation in one or more slots of up to 32 logical slots in the future) or 1100 ms (e.g., for periodic resource reservation). In some cases, a UE configured for communication in an NR network may use a sensing procedure for aperiodic or periodic resource reservation.

According to the sensing procedure, the UE may decode control messages relating to resource reservations of other UEs, as well as perform measurements (e.g., RSRP measurements) associated with one or more sidelink channels. For example, UEs may transmit reservation information (e.g., in SCI) that indicates a resource reservation for a current slot (e.g., the slot in which the reservation information is transmitted) and for one or more (e.g., up to two, or another threshold value that may be defined) future slots. A resource allocation associated with a resource reservation may be one or more sub-channels in a frequency domain and one slot in a time domain. In periodic resource reservation, a UE may signal (e.g., in the reservation information in SCI) a period for the resource reservation (e.g., a value between 0 ms and 1000 ms). Periodic resource reservation may be disabled by configuration in some UEs.

As shown in FIG. 5, the UE may determine to select resources for a sidelink communication based at least in part on a resource selection trigger. For example, resource selection may be triggered when the UE has a packet that is to be transmitted. Based at least in part on the resource selection trigger, the UE may determine one or more resources that are available for selection in a resource selection window. That is, the UE may determine the one or more available resources based at least in part on the sensing procedure performed by the UE. For example, the sensing procedure may provide an indication of resources in the resource selection window that are occupied and/or resources in the resource selection window associated with high interference.

In some cases, if a resource selection trigger occurs in a subframe n, the resource selection window is from $n+T_1$ to $n+T_2$. In this case, $T_1$ may be less than a processing time ($T_{proc,1}$). Moreover, $T_2$ may be greater than or equal to $T_{2,min}$, which may be a value configured for the UE based at least in part on a priority of the UE, and less than or equal to a remaining packet delay budget (PDB) of the UE.

However, in a full-duplex mode, the UE may experience self-interference (e.g., interference in receptions by the UE that is caused by transmissions by the UE), which may result in RSRP measurements being less reliable than is the case for a half-duplex mode (e.g., an accuracy of an RSRP measurement of a channel may be reduced). As a result, when a lower layer of the UE (e.g., that performs the RSRP measurement) reports the RSRP measurement to a higher layer of the UE (e.g., that determines a resource availability and selects a resource), the higher layer may make a less reliable selection (e.g., an accuracy of a resource selection with respect to whether the selected resource is available may be reduced).

Some aspects described herein may enable a UE to pass additional information, such as an SINR measurement, to an upper layer to enable a determination of a resource availability. For example, a UE may determine a resource availability using measurement information that includes a first measurement of a set of resources (e.g., an RSRP) and a second measurement of the set of resources (e.g., an SINR) and may communicate using a selected resource. In this way, the UE may improve an accuracy of resource availability determinations in, for example, a full-duplex mode, thereby reducing a likelihood of interference or dropped communications.

As indicated above, FIG. 5 is provided as an example Other examples may differ from what is described with respect to FIG. 5.

Figure 6:
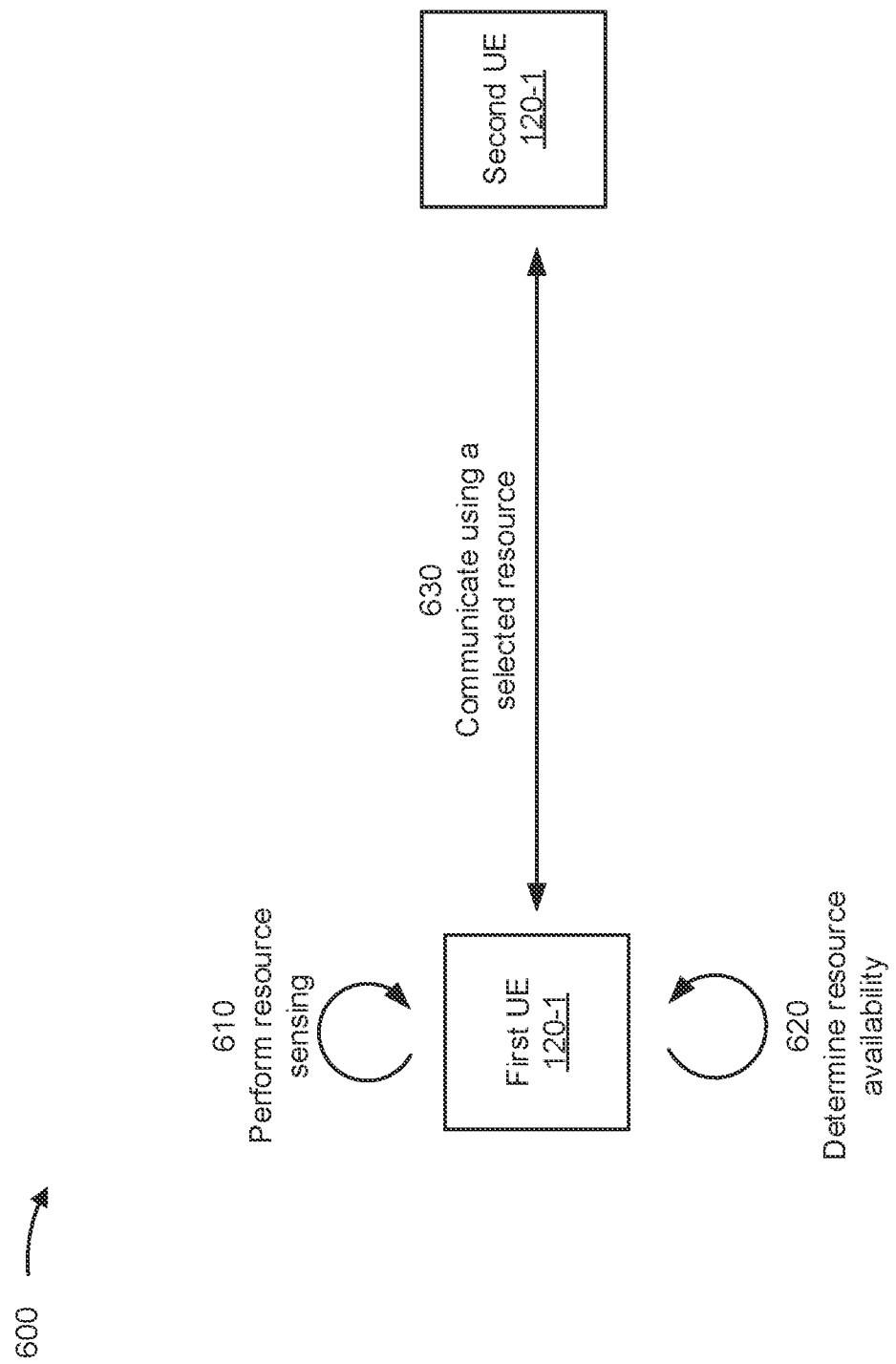
FIG. 6 is a diagram illustrating an example associated with sidelink channel access using reference signal received power (RSRP) and signal to interference and noise ratio (SINR) measurements, in accordance with the present disclosure.

FIG. 6 is a diagram illustrating an example 600 associated with sidelink channel access using RSRP and SINR measurements, in accordance with the present disclosure. As shown in FIG. 6, example 600 includes communication between a first UE 120-1 and a second UE 120-2. In some aspects, the UEs 120 may be included in a wireless network, such as wireless network 100. The UEs 120 may communicate via a wireless sidelink link, which may include a forward link and a reverse link.

As further shown in FIG. 6, and by reference number 610, first UE 120-1 may perform resource sensing. For example, first UE 120-1 may monitor a set of resources in a sensing window and perform a set of measurements of the set of resources. In some aspects, first UE 120-1 may perform a plurality of types of measurements of a resource. For example, first UE 120-1 may measure an RSRP value for a resource and an SINR value for the resource.

Additionally, or alternatively, first UE 120-1 may determine another measurement associated with the resource, such as determining whether the resource is impacted by self-interference. In this case, first UE 120-1 may determine whether a full-duplex capability is causing, for a particular resource, self-interference that may affect an accuracy of an RSRP measurement for the particular resource. Additionally, or alternatively, first UE 120-1 may determine an estimate of an amount of remaining self-interference. For example, first UE 120-1 may determine, based at least in part on a queue of data, whether self-interference will affect a resource in a subsequent time period. Additionally, or alternatively, first UE 120-1 may determine a configuration relating to first UE 120-1 and a resource. For example, first UE 120-1 may determine whether first UE 120-1 has applied an interference cancelling technique in connection with a resource. In this case, first UE 120-1 may determine a type of interference cancelling technique that has been applied, such as a complexity level of the interference cancelling technique or a quantity of kernels in a non-linear interference cancellation (NLIC) technique, among other examples. Additionally, or alternatively, first UE 120-1 may determine a transmit power of a transmit signal overlapping with the sensed resource (e.g., causing self-interference).

As further shown in FIG. 6, and by reference number 620, first UE 120-1 may determine a resource availability. For example, first UE 120-1 may determine a resource availability for a set of resources based at least in part on a set of measurements. In this case, first UE 120-1 may pass the set of measurements from a lower layer (e.g., the physical (PHY) layer) to an upper layer (e.g., an application (APP) layer) to enable an entity at the upper layer (e.g., an APP entity or a medium access control (MAC) entity, among other examples) to select a resource. For example, first UE 120-1 may pass, when operating in a full-duplex mode, both an RSRP measurement and an SINR measurement regarding a resource to enable a more accurate determination of a resource availability than is achieved using only the RSRP measurement. Additionally, or alternatively, first UE 120-1 may pass a bit indicator identifying whether a resource is impacted by self-interference, a prediction of an amount of remaining self-interference, whether an interference cancellation technique was applied, a configuration of the interference cancellation technique, or a transmit power of a transmit signal overlapping with the resource, among other examples.

In some aspects, first UE 120-1 may configure a threshold for evaluating a measurement to determine a resource availability. For example, first UE 120-1 may use an RSRP threshold to determine whether a resource is available. In some aspects, first UE 120-1 may adjust a threshold based at least in part on evaluating whether resources are available. For example, first UE 120-1 may select a first RSRP threshold to evaluate a resource availability and determine that fewer than a configured quantity of resources are evaluated as available using the first RSRP threshold (e.g., fewer resources than are necessary to convey queued data). In this case, first UE 120-1 may select a second RSRP threshold (e.g., a higher RSRP threshold) and re-evaluate one or more of the set of resources (e.g., only resources not affected by self-interference or only resources affected by self-interference). First UE 120-1 may continue to increment the RSRP threshold until a configured quantity of resources are evaluated as available or a maximum RSRP threshold is reached. In this case, an initial selection for the RSRP threshold and/or a step size for incrementing the RSRP threshold may be based at least in part on a stored configuration and may differ for resources affected by self-interference (e.g., a 2 decibel (dB) step-size) and resources not affected by self-interference (e.g., a 1 dB step size). In some aspects, the alteration to the RSRP threshold may be based at least in part on information passed to the higher layer, such as another measurement (e.g., an SINR measurement), information identifying an expected amount of remaining self-interference, or information identifying an interference cancellation technique, among other examples. Although some aspects are described in terms of an RSRP measurement, other types of measurements are contemplated.

In some aspects, first UE 120-1 may perform a plurality of determinations of resource availability corresponding to a plurality of measurements. For example, first UE 120-1 may perform a first resource availability determination based at least in part on RSRP measurements of a set of resources and a second resource availability determination based at least in part on SINR measurements of the set of resources. In this case, the resource availability determinations may occur at a higher layer, as described above, or at a lower layer, which may pass a bit indicator indicating results of the resource availability determinations to a higher layer. For example, a lower layer of first UE 120-1 may pass two bits for each resource to indicate the RSRP-based availability and the SINR-based availability of each resource. In this case, first UE 120-1 (e.g., a higher layer entity) may select, for use, between two resources with RSRP-based availability based at least in part on which of the two resources also has SINR-based availability. In this way, first UE 120-1 may use RSRP and SINR measurements to improve a reliability of resource availability determinations.

As further shown in FIG. 6, and by reference number 630, first UE 120-1 may communicate with second UE 120-2 using a selected resource. For example, first UE 120-1 may transmit, on a sidelink, using a resource determined to be available based at least in part on an RSRP measurement and/or an SINR measurement, among other examples. Additionally, or alternatively, first UE 120-1 may transmit a resource reservation based at least in part on selecting a resource, thereby avoiding other UEs 120 attempting to reserve the resource. Additionally, or alternatively, first UE 120-1 may indicate to second UE 120-2 that a selected resource is available for second UE 120-2 to transmit to first UE 120-1.

In some aspects, first UE 120-1 may communicate using a resource selected at an upper layer. For example, when first UE 120-1 passes a set of measurements from a PHY layer to an APP layer or MAC layer, first UE 120-1 may use an entity at an upper layer (e.g., a MAC entity) to select a resource, reserve the resource, and communicate using the resource. In some aspects, first UE 120-1 may communicate using a resource selected based at least in part on a evaluating an availability of the resource. For example, first UE 120-1 may evaluate a set of resources using an RSRP threshold or SINR threshold (e.g., an initial RSRP or SINR threshold or an incremented RSRP or SINR threshold, as described above), select a resource from the set of resources, and communicate (e.g., transmit or receive) using the selected resource. In this case, the selected resource may be a resource that satisfies an RSRP-based availability evaluation and/or a SINR-based availability evaluation, thereby improving reliability relative to other techniques for resource availability evaluation.

As indicated above, FIG. 6 is provided as an example Other examples may differ from what is described with respect to FIG. 6.

Figure 7:
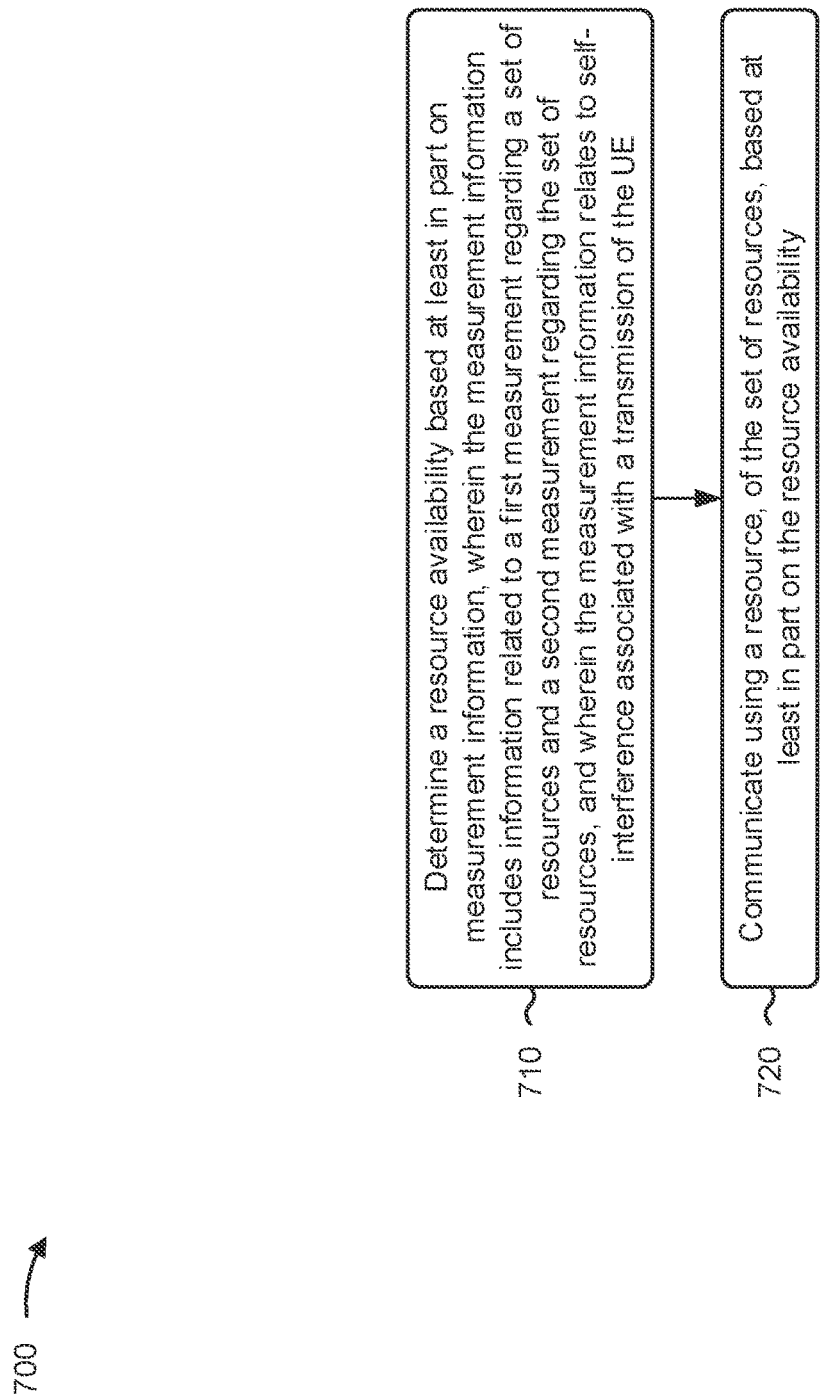
FIG. 7 is a diagram illustrating an example process associated with sidelink channel access using RSRP and SINR measurements, in accordance with the present disclosure.

FIG. 7 is a diagram illustrating an example process 700 performed, for example, by a UE, in accordance with the present disclosure. Example process 700 is an example where the UE (e.g., UE 120) performs operations associated with sidelink channel access using RSRP and SINR measurements.

As shown in FIG. 7, in some aspects, process 700 may include determining a resource availability based at least in part on measurement information, wherein the measurement information includes information related to a first measurement regarding a set of resources and a second measurement regarding the set of resources, and wherein the measurement information relates to self-interference associated with a transmission of the UE (block 710). For example, the UE (e.g., using communication manager 140 and/or determination component 808, depicted in FIG. 8) may determine a resource availability based at least in part on measurement information, wherein the measurement information includes information related to a first measurement regarding a set of resources and a second measurement regarding the set of resources, and wherein the measurement information relates to self-interference associated with a transmission of the UE, as described above.

As further shown in FIG. 7, in some aspects, process 700 may include communicating using a resource, of the set of resources, based at least in part on the resource availability (block 720). For example, the UE (e.g., using communication manager 140, reception component 802, and/or transmission component 804, depicted in FIG. 8) may communicate using a resource, of the set of resources, based at least in part on the resource availability, as described above.

Process 700 may include additional aspects, such as any single aspect or any combination of aspects described below and/or in connection with one or more other processes described elsewhere herein.

In a first aspect, the first measurement is a reference signal received power measurement and the second measurement is a signal to interference and noise ratio measurement.

In a second aspect, alone or in combination with the first aspect, the measurement information includes an indicator of whether the resource is affected by self-interference.

In a third aspect, alone or in combination with one or more of the first and second aspects, the measurement information includes an indicator of an expected amount of remaining self-interference associated with a communication window.

In a fourth aspect, alone or in combination with one or more of the first through third aspects, the measurement information includes an indicator of whether an interference cancellation procedure has been applied in connection with a communication window.

In a fifth aspect, alone or in combination with one or more of the first through fourth aspects, the measurement information includes an indicator of a type of interference cancellation procedure that has been applied in connection with a communication window.

In a sixth aspect, alone or in combination with one or more of the first through fifth aspects, the measurement information includes an indicator of a transmit power of a transmit signal overlapping with a sensed resource corresponding to the set of resources.

In a seventh aspect, alone or in combination with one or more of the first through sixth aspects, determining the resource availability comprises determining that a first resource availability, determined using a first measurement threshold for the set of resources, does not satisfy a resource availability threshold, and determining a second resource availability using a second measurement threshold for at least a subset of the set of resources, wherein the subset of the set of resources is at least one of: one or more resources not subject to self-interference, one or more resources subject to self-interference, or a combination of the one or more resources not subject to self-interference and the one or more resources subject to self-interference.

In an eighth aspect, alone or in combination with one or more of the first through seventh aspects, a difference between the first threshold and the second threshold is based at least in part on whether the subset of the set of resources is subject to self-interference.

In a ninth aspect, alone or in combination with one or more of the first through eighth aspects, the measurement information indicates a first availability of the set of resources based at least in part on the first measurement and a second availability of the set of resources based at least in part on the second measurement.

In a tenth aspect, alone or in combination with one or more of the first through ninth aspects, the second measurement includes reliability information regarding the first measurement.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
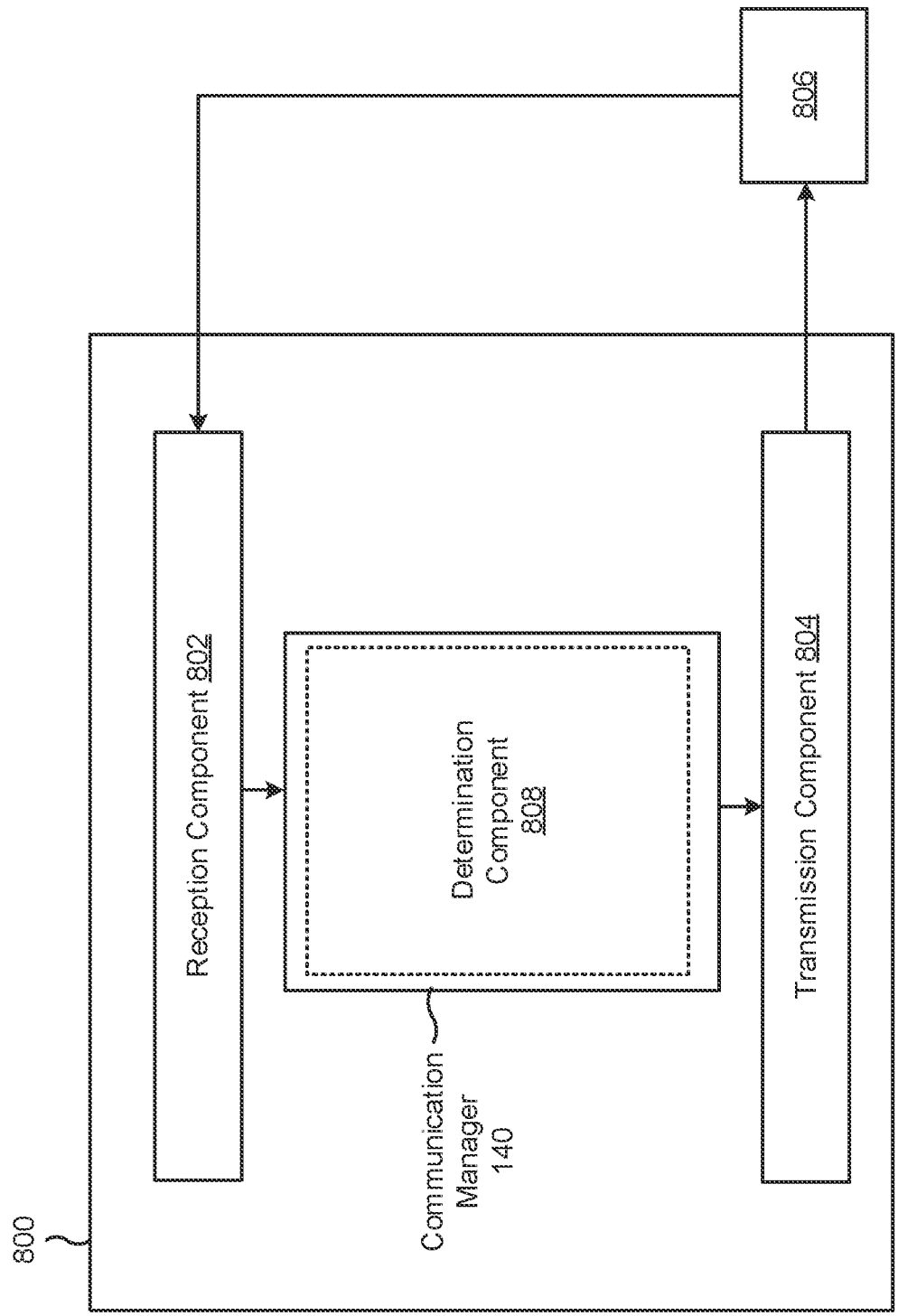
FIG. 8 is a block diagram of an example apparatus for wireless communication, in accordance with the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include a determination component 808, among other examples.

In some aspects, the apparatus 800 may be configured to perform one or more operations described herein in connection with FIG. 6. Additionally, or alternatively, the apparatus 800 may be configured to perform one or more processes described herein, such as process 700 of FIG. 7 or a combination thereof. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The determination component 808 may determine a resource availability based at least in part on measurement information, wherein the measurement information includes information related to a first measurement regarding a set of resources and a second measurement regarding the set of resources, and the measurement information relates to self-interference associated with a transmission of the UE. The reception component 802 and/or the transmission component 804 may communicate using a resource, of the set of resources, based at least in part on the resource availability.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: determining a resource availability based at least in part on measurement information, wherein the measurement information includes information related to a first measurement regarding a set of resources and a second measurement regarding the set of resources, and wherein the measurement information relates to self-interference associated with a transmission of the UE; and communicating using a resource, of the set of resources, based at least in part on the resource availability.

Aspect 2: The method of Aspect 1, wherein the first measurement is a reference signal received power measurement and the second measurement is a signal to interference and noise ratio measurement.

Aspect 3: The method of any of Aspects 1 to 2, wherein the measurement information includes an indicator of whether the resource is affected by self-interference.

Aspect 4: The method of any of Aspects 1 to 3, wherein the measurement information includes an indicator of an expected amount of remaining self-interference associated with a communication window.

Aspect 5: The method of any of Aspects 1 to 4, wherein the measurement information includes an indicator of whether an interference cancellation procedure has been applied in connection with a communication window.

Aspect 6: The method of any of Aspects 1 to 5, wherein the measurement information includes an indicator of a type of interference cancellation procedure that has been applied in connection with a communication window.

Aspect 7: The method of any of Aspects 1 to 6, wherein the measurement information includes an indicator of a transmit power of a transmit signal overlapping with a sensed resource corresponding to the set of resources.

Aspect 8: The method of any of Aspects 1 to 7, wherein determining the resource availability comprises: determining that a first resource availability, determined using a first measurement threshold for the set of resources, does not satisfy a resource availability threshold; and determining a second resource availability using a second measurement threshold for at least a subset of the set of resources, wherein the subset of the set of resources is at least one of: one or more resources not subject to self-interference, one or more resources subject to self-interference, or a combination of the one or more resources not subject to self-interference and the one or more resources subject to self-interference.

Aspect 9: The method of Aspect 8, wherein a difference between the first threshold and the second threshold is based at least in part on whether the subset of the set of resources is subject to self-interference.

Aspect 10: The method of any of Aspects 1 to 9, wherein the measurement information indicates a first availability of the set of resources based at least in part on the first measurement and a second availability of the set of resources based at least in part on the second measurement.

Aspect 11: The method of any of Aspects 1 to 10, wherein the second measurement includes reliability information regarding the first measurement.

Aspect 12: An apparatus for wireless communication at a device, comprising a processor; memory coupled with the processor; and instructions stored in the memory and executable by the processor to cause the apparatus to perform the method of one or more Aspects of Aspects 1-11.

Aspect 13: A device for wireless communication, comprising a memory and one or more processors coupled to the memory, the memory and the one or more processors configured to perform the method of one or more Aspects of Aspects 1-11.

Aspect 14: An apparatus for wireless communication, comprising at least one means for performing the method of one or more Aspects of Aspects 1-11.

Aspect 15: A non-transitory computer-readable medium storing code for wireless communication, the code comprising instructions executable by a processor to perform the method of one or more Aspects of Aspects 1-11.

Aspect 16: A non-transitory computer-readable medium storing a set of instructions for wireless communication, the set of instructions comprising one or more instructions that, when executed by one or more processors of a device, cause the device to perform the method of one or more Aspects of Aspects 1-11.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, individually or collectively configured to:
      perform a plurality of measurements regarding a set of resources and self-interference associated with a transmission of the UE;
      pass measurement information relating to the plurality of measurements from a lower layer of the UE to a higher layer of the UE;
      determine, at the higher layer of the UE, a resource availability based at least in part on the measurement information; and
      communicate using a resource, of the set of resources, based at least in part on the resource availability.

2. The UE of claim 1, wherein the plurality of measurements includes a reference signal received power measurement and a signal to interference and noise ratio measurement.

3. The UE of claim 1, wherein the measurement information includes an indicator of whether the resource is affected by self-interference.

4. The UE of claim 1, wherein the measurement information includes an indicator of an expected amount of remaining self-interference associated with a communication window.

5. The UE of claim 1, wherein the measurement information includes an indicator of whether an interference cancellation procedure has been applied in connection with a communication window.

6. The UE of claim 1, wherein the measurement information includes an indicator of a type of interference cancellation procedure that has been applied in connection with a communication window.

7. The UE of claim 1, wherein the measurement information includes an indicator of a transmit power of a transmit signal overlapping with a sensed resource corresponding to the set of resources.

8. The UE of claim 1, wherein the one or more processors, to determine the resource availability, are individually or collectively configured to:

determine that a first resource availability, determined using a first measurement threshold for the set of resources, does not satisfy a resource availability threshold; and determine a second resource availability using a second measurement threshold for at least a subset of the set of resources, wherein the subset of the set of resources is at least one of:
one or more resources not subject to self-interference,
one or more resources subject to self-interference, or
a combination of the one or more resources not subject to self-interference and the one or more resources subject to self-interference.

9. The UE of claim 8, wherein a difference between the first measurement threshold and the second measurement threshold is based at least in part on whether the subset of the set of resources is subject to self-interference.

10. The UE of claim 1, wherein the measurement information indicates a first availability, of the set of resources based at least in part on a first measurement of the plurality of measurements, and a second availability of the set of resources and based at least in part on a second measurement of the plurality of measurements.

11. The UE of claim 1, wherein the plurality of measurements includes a first measurement regarding the set of resources and a second measurement includes reliability information regarding the first measurement.

12. A method of wireless communication performed by a user equipment (UE), comprising:
performing a plurality of measurements regarding a set of resources and self-interference associated with a transmission of the UE;
passing measurement information relating to the plurality of measurements from a lower layer of the UE to a higher layer of the UE;
determining, at the higher layer of the UE, a resource availability based at least in part on the measurement information; and
communicating using a resource, of the set of resources, based at least in part on the resource availability.

13. The method of claim 12, wherein the plurality of measurements includes a reference signal received power measurement and a signal to interference and noise ratio measurement.

14. The method of claim 12, wherein the measurement information includes an indicator of whether the resource is affected by self-interference.

15. The method of claim 12, wherein the measurement information includes an indicator of an expected amount of remaining self-interference associated with a communication window.

16. The method of claim 12, wherein the measurement information includes an indicator of whether an interference cancellation procedure has been applied in connection with a communication window.

17. The method of claim 12, wherein the measurement information includes an indicator of a type of interference cancellation procedure that has been applied in connection with a communication window.

18. The method of claim 12, wherein the measurement information includes an indicator of a transmit power of a transmit signal overlapping with a sensed resource corresponding to the set of resources.

19. The method of claim 12, wherein determining the resource availability comprises:

determining that a first resource availability, determined using a first measurement threshold for the set of resources, does not satisfy a resource availability threshold; and determining a second resource availability using a second measurement threshold for at least a subset of the set of resources, wherein the subset of the set of resources is at least one of:
one or more resources not subject to self-interference,
one or more resources subject to self-interference, or
a combination of the one or more resources not subject to self-interference and the one or more resources subject to self-interference.

20. The method of claim 19, wherein a difference between the first measurement threshold and the second measurement threshold is based at least in part on whether the subset of the set of resources is subject to self-interference.

21. The method of claim 12, wherein the measurement information indicates a first availability, of the set of resources and based at least in part on a first measurement of the plurality of measurements, and a second availability of the set of resources and based at least in part on a second measurement of the plurality of measurements.

22. The method of claim 12, wherein the plurality of measurements includes a first measurement regarding the set of resources and a second measurement includes reliability information regarding the first measurement.

23. A non-transitory computer-readable medium storing a set of instructions for wireless communication, the set of instructions comprising:
one or more instructions that, when executed by one or more processors of a user equipment (UE), cause the UE to:
perform a plurality of measurements regarding a set of resources and self-interference associated with a transmission of the UE;
pass measurement information relating to the plurality of measurements from a lower layer of the UE to a higher layer of the UE;
determine, at the higher layer of the UE, a resource availability based at least in part on the measurement information; and
communicate using a resource, of the set of resources, based at least in part on the resource availability.

24. The non-transitory computer-readable medium of claim 23, wherein the plurality of measurements includes a reference signal received power measurement and a signal to interference and noise ratio measurement.

25. The non-transitory computer-readable medium of claim 23, wherein the measurement information includes an indicator of whether the resource is affected by self-interference.

26. The non-transitory computer-readable medium of claim 23, wherein the measurement information includes an indicator of an expected amount of remaining self-interference associated with a communication window.

27. An apparatus for wireless communication, comprising:
means for performing a plurality of measurements regarding a set of resources and self-interference associated with a transmission of the apparatus;
means for passing measurement information relating to the plurality of measurements from a lower layer of the apparatus to a higher layer of the apparatus;

means for determining, at the higher layer of the apparatus, a resource availability based at least in part on the measurement information; and means for communicating using a resource, of the set of resources, based at least in part on the resource availability.

28. The apparatus of claim 27, wherein the plurality of measurements includes a reference signal received power measurement a signal to interference and noise ratio measurement.

29. The apparatus of claim 27, wherein the measurement information includes an indicator of whether the resource is affected by self-interference.

30. The apparatus of claim 27, wherein the measurement information includes an indicator of an expected amount of remaining self-interference associated with a communication window.

* * * * *